Patented June 17, 1930

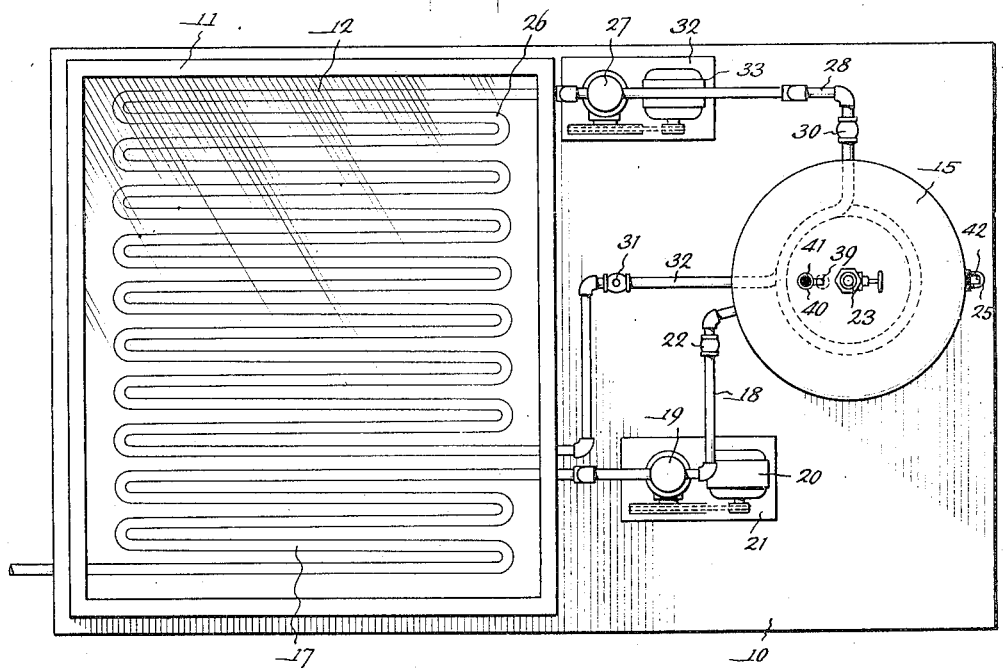
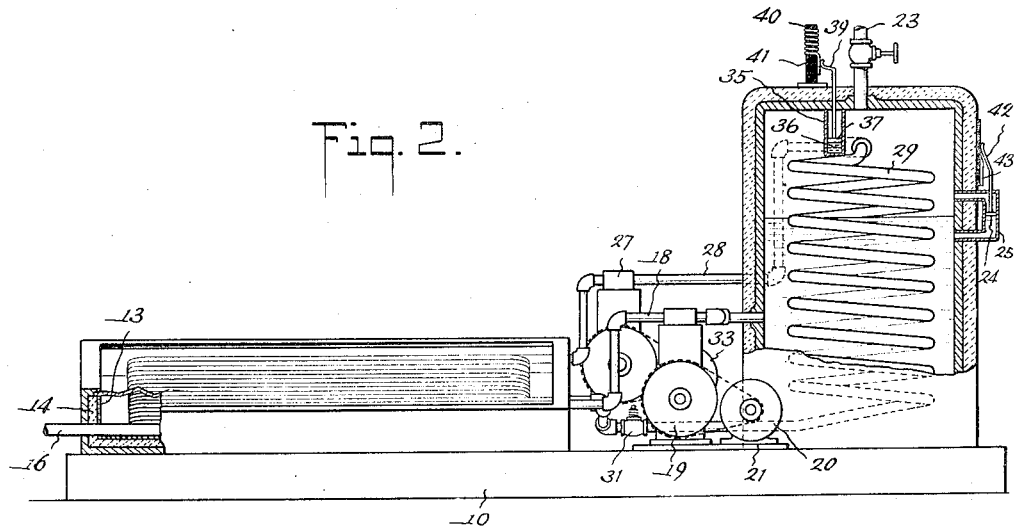

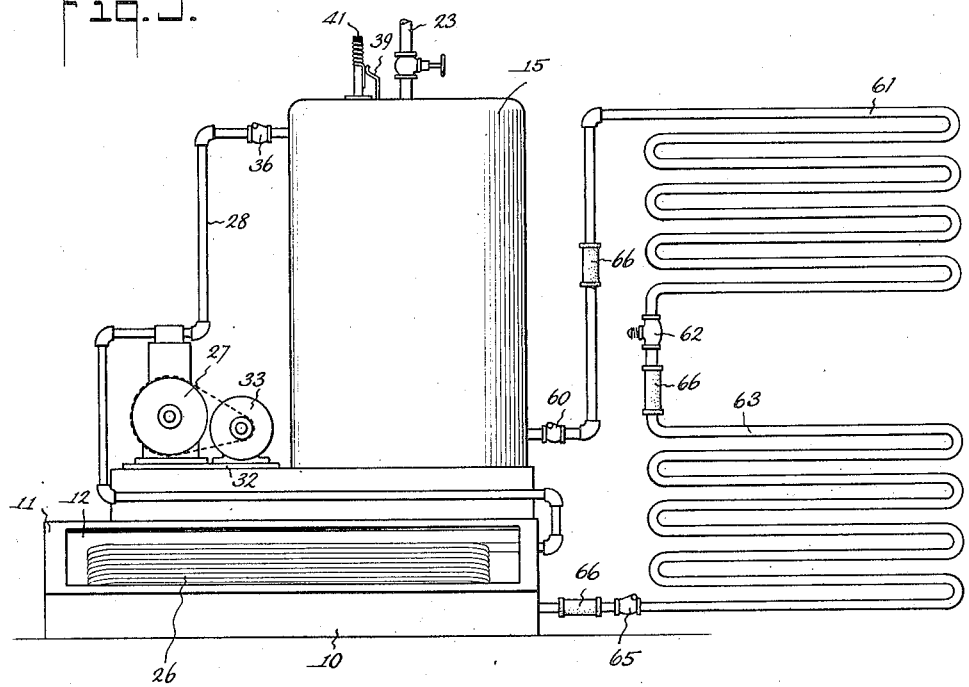
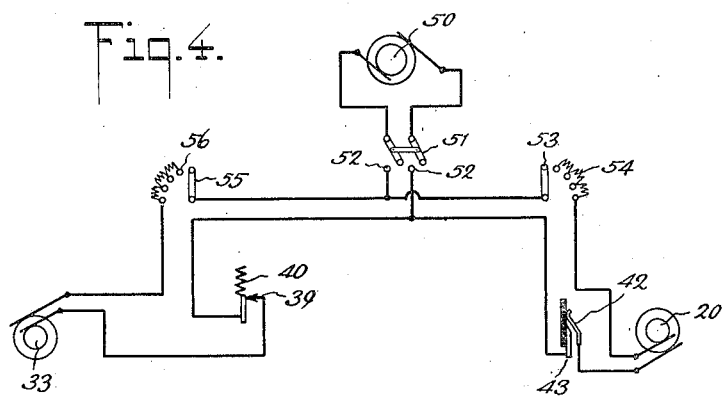

1,765,136

UNITED STATES PATENT OFFICE

CHARLES HADDOX DRANE, JR., OF DELRAY, FLORIDA

APPARATUS FOR UTILIZING SOLAR HEAT

Application filed May 6, 1927. Serial No. 189,324.

The present invention is concerned with the provision of an apparatus for utilizing solar heat for steam generating purposes.

The apparatus includes a chamber in which the sun's heat is concentrated and collected, a steam generator into which heated gas from the collector chamber is introduced under pressure. After the heat of the gas has been utilized in the steam generator by transfer to the water therein, the gas may be expanded and returned directly to the collector chamber for reheating, or it may be passed through a condenser or cooler, through an expansion valve into a cooling coil or evaporator and returned thence to the collector chamber.

The use of a highly expansible gas such for instance as an ammonia gas in the system permits the heat collected within the relatively spacious collecting chamber to be utilized within the comparatively small space of the generator.

Objects of the invention are to provide an apparatus of simple, practical construction, which will be fully automatic in operation, well suited to the requirements of economical manufacture, and well suited for use in connection with various types of heat concentrating reflectors of the character now commonly employed in connection with solar motors and other solar heat-utilizing apparatus.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Fig. 1 is a top plan view of an apparatus used for generating steam.

Fig. 2 is a view mainly in side elevation of the apparatus of Fig. 1, but with parts broken away and in section for clearness.

Fig. 3 is an end elevation of the apparatus, but showing the same used in connection with a refrigerating unit.

Fig. 4 is a wiring diagram showing the automatic controlling circuits and associated switches and motors.

Referring first to Figs. 1 and 2 of the drawings I have shown a supporting base or platform 10, upon one end of which is mounted a heat collecting chamber designated generally by the reference numeral 11. This chamber of box-like formation is provided with a slightly inclined glass top 12, is metal lined at 13 and heat insulated at 14. Mounted on the other end of the base is a steam generator 15 preferably sheathed with heat insulating material. The water supply for the steam generator enters through an inlet pipe 16 having several reverse bends or coils 17 disposed within the heat collecting chamber 11, so that the feed water is preheated on its way to the boiler. From the coil 17 the water is forced through a pipe 18 into the boiler 15 by a pump 19 driven by an electric motor 20, pump and motor being preferably mounted upon a supporting base 21 on the platform 10. A check valve 22 in the pipe line 18 prevents flow of water from the generator back to the pump, and a pipe 23 communicating with the top of the generator chamber is used for withdrawing the steam. The water level in the generator is automatically regulated by a float 24 in a gauge glass 25. This float controls an electric switch in a manner to be later described for stopping the motor 20 and consequently the pump 19 when the desired water level has been reached.

Also disposed in the heat collecting chamber 11 is a length of coiled pipe 26 adapted to contain ammonia gas or any generally equivalent expansible gas. This gas becoming highly heated in the collector is delivered in compressed condition by a compressor 27 through a pipe 28 to a heating coil 29 within the steam generator, this coil supplying the necessary heat for boiling the water.

A check valve 30 in the pipe 28 prevents flow of compressed gases back through the compressor, and a pressure valve 31 in a return pipe 32 to the coil 26 permits the gases from the coil 29 to re-enter the coil 26 in the collector chamber after they have been somewhat cooled by heat exchange with the water in the boiler.

The compressor 27 is preferably mounted on a base 32 together with its electric driving motor 33, and the motor is thermostatically controlled in order to stop the compressor when a dangerously high temperature is reached within the steam generator. The thermostat which I have illustrated includes a tube 35 mounted within the steam generator 15 and partially filled with mercury 36. The mercury by its expansion actuates a float 37 carrying a contact finger 39 adapted to engage with any of a series of convolutions 40 of a resistance wire wound about an insulating post 41 rising from the top of the generator.

The resistance-varying switch 39, 40 forms part of the circuit for the motor 33, which circuit will be more fully described hereafter.

The float 24 carries a contact finger 42 working through the gauge glass 25 and coacting with a stationary contact 43 on the outer wall of the steam generator. As the water level is raised in the generator, the float 24 elevates the finger 42, moving it out of contact with its associated plate 43, and breaking the circuit of the motor 20. The particular circuits will be more fully described in connection with Fig. 4.

From the foregoing description it will be seen that the unit is clearly automatic in operation. Hot gases are withdrawn from the coil 26 compressed and delivered to the coil 29 where they serve to heat the water within the boiler and generate steam, the latter escaping through pipe 23. The gases are returned to the coil 26 through a pressure valve 31. A constant water lever is maintained in the boiler by the float controlled switch of the compressor motor 33. The creation of a dangerously high temperature in the steam generator is prevented by the thermostat 39, 40 which gradually cuts off the current from the motor 33 as the generator temperature reaches a dangerous point.

In Fig. 4 I have illustrated a wiring diagram in which a source of electric power is indicated at 50, and 51 represents a double switch associated with contacts 52 to simultaneously close two circuits; one through the motor 20, and one through the motor 33.

The circuit through the motor 20 may be controlled by hand switch 53 operating in conjunction with a rheostat 54 and is automatically controlled by the float finger 42 and its associated contact 43.

The circuit through the motor 33 may also be manually opened or closed by switch 55 operating in conjunction with a rheostat 56, and resistance 40 is gradually thrown into the circuit by the contact finger 39 as the temperature in the generator increases.

Thus the feed water pump is positively cut off whenever the water reaches a predetermined level, and automatically started again when the water drops below said level. The production of excessive temperatures in the generator results in gradually slowing down motor 33 by throwing in the resistance 40.

In Fig. 3 of the drawings, I have shown substantially the same unit, except that in this instance the gases which have passed through the heating pipe 29 instead of being returned directly to the coil 26 are forced through a check valve 60 into a condensing coil 61 from which they flow through an expansion valve 62 into an expander or evaporator 63, the expansion of the liquefied ammonia cooling the expander in the usual manner. From the expansion coil 63, gases are returned to the coil 26 through a valve 65.

Preferably short sections of non-metallic, non-heat-conductive pipes 66 are interposed between the coil 29, condenser 61, expander 63, and coil 26, thereby preventing the conduction of heat from the relatively hot to the relatively cold portions of the continuous pipe line system.

Obviously the drawings of the present invention are somewhat diagrammatic, and the invention may be utilized in connection with various standard types of steam generators and refrigerating units. The operation of the device will be more or less apparent from the foregoing description, but it may be briefly summarized as follows. Boiler 15 is supplied with water through the pipe line 17, the feed water being preheated in the collector chamber 11. The motor 20 of the pump 19 which supplies the water to the boiler is electrically float-controlled to automatically maintain the water level at any desired height. The generated steam escapes through the pipe 23.

The gas heated in the coil 26 of the collector is compressed and passed to the heating coil 29, whence it may be returned directly to the coil 26, or may be condensed and expanded to produce refrigeration before it is returned. The pipe line systems are equipped with check valves to prevent any reverse flow of gases or liquids, and the unit rendered absolutely safe by the thermostatic control of the compressor motor, and the use of expansion valves.

Obviously various changes and alterations might be made in the general form and arrangement of parts described without departing from the invention. Hence I do not wish to limit myself to the details set forth, but shall consider myself at liberty to make such changes and alterations as fairly fall within the spirit and scope of the appended claims.

I claim:

1. Apparatus for utilizing solar heat including a glass topped heat-collecting chamber adapted to be exposed to the rays of the sun, a heat exchanger, a closed gas circulating system including a coil in the heat collector and a coil in the heat exchanger, a compressor for compressing the hot gas from the heat collector and delivering it to the heat exchanger, means for delivering water to the heat exchanger including a feed water pipe led through the collector to preheat the feed water, a pump for delivering the preheated water to the exchanger, and a float in the exchanger electrically controlling the pump.

2. Apparatus for utilizing solar heat including a glass topped heat-collecting chamber adapted to be exposed to the rays of the sun, a heat exchanger, a closed gas circulating system including a coil in the heat collector and a coil in the heat exchanger, a compressor for compressing the hot gas from the heat collector and delivering it to the heat exchanger, and a thermostat in the exchanger controlling the compressor.

CHARLES HADDOX DRANE, Jr.